US009422020B2

(12) United States Patent
Kim (10) Patent No.: US 9,422,020 B2
(45) Date of Patent: Aug. 23, 2016

(54) DRIVER PROTECTIVE DEVICE FOR TWO-WHEELED VEHICLE

(71) Applicant: INNODESIGN CO., LTD., Seongnam-si, Gyeonggi-do (KR)

(72) Inventor: Young-Se Kim, Seongnam-si (KR)

(73) Assignee: INNODESIGN CO., LTD. (KR)

( * ) Notice: Subject to any disclaimer, the term of this patent is extended or adjusted under 35 U.S.C. 154(b) by 0 days.

(21) Appl. No.: 14/768,454

(22) PCT Filed: Feb. 7, 2014

(86) PCT No.: PCT/KR2014/001051
§ 371 (c)(1),
(2) Date: Aug. 17, 2015

(87) PCT Pub. No.: WO2014/129762
PCT Pub. Date: Aug. 28, 2014

(65) Prior Publication Data
US 2016/0001842 A1    Jan. 7, 2016

(30) Foreign Application Priority Data

Feb. 19, 2013   (KR) ........................ 10-2013-0017569

(51) Int. Cl.
*B62J 17/08*   (2006.01)
*B62J 9/00*    (2006.01)

(52) U.S. Cl.
CPC ................ *B62J 17/08* (2013.01); *B62J 9/001* (2013.01); *B62J 2017/086* (2013.01)

(58) Field of Classification Search
CPC ........ B62J 17/00; B62J 17/08; B62J 17/065; B62J 13/02; B62J 23/00; B62J 2017/083
USPC .............................. 280/304.3; 296/218, 78.1
See application file for complete search history.

(56) References Cited

U.S. PATENT DOCUMENTS

| 3,284,130 | A | * | 11/1966 | Michael | B62J 17/08 296/78.1 |
| 4,045,077 | A | * | 8/1977 | DeVone | B62J 17/00 224/422 |
| 4,336,964 | A | * | 6/1982 | Pivar | B60J 5/0487 180/210 |
| 1,632,448 | A |   | 12/1986 | Yagasaki et al. | |
| 4,632,448 | A | * | 12/1986 | Yagasaki | B60J 7/08 296/102 |
| 4,798,399 | A | * | 1/1989 | Cameron | B60R 21/13 280/304.3 |
| 4,973,082 | A | * | 11/1990 | Kincheloe | B60R 21/13 280/756 |
| 6,010,173 | A | * | 1/2000 | Chyan-Luen | B60Q 1/2611 296/78.1 |

(Continued)

FOREIGN PATENT DOCUMENTS

| JP | 1059250 A | 3/1998 |
| JP | 3048902 U | 3/1998 |

(Continued)

*Primary Examiner* — Tony Winner (57) ABSTRACT

A driver protective device for a two-wheeled vehicle according to the present invention, includes: a main frame including a mounting frame which is mounted on a body of the two-wheeled vehicle, and a panel frame which is fixed to the mounting frame and has a front transparent panel installed therein; a storage box which is mounted on a rear portion of the two-wheeled vehicle; and an attachable protection panel including an upper panel which is attached to or detached from one end of the panel frame of the main frame, and a back panel which is attached to or detached from one side of the storage box, wherein the upper panel and the back panel are pivotly connected to each other.

5 Claims, 7 Drawing Sheets

(56) References Cited

U.S. PATENT DOCUMENTS

| | | | |
|---|---|---|---|
| 6,325,441 B1 * | 12/2001 | Ugolini | B62J 17/08 296/107.08 |
| 2002/0027370 A1 | 3/2002 | Kurohori et al. | |
| 2006/0192403 A1 * | 8/2006 | Weddington | A45B 23/00 296/77.1 |

FOREIGN PATENT DOCUMENTS

| | | |
|---|---|---|
| KR | 200225447 | 6/2001 |
| KR | 200441063 | 7/2008 |
| KR | 20100042599 | 4/2010 |
| KR | 20100007236 | 7/2010 |

* cited by examiner

DRIVER PROTECTIVE DEVICE FOR TWO-WHEELED VEHICLE

TECHNICAL FIELD

The present invention relates to a driver protective device for a two-wheeled vehicle such as a bicycle or motorcycle for protecting a driver from external environmental effects due to sunlight, wind or the like during driving.

BACKGROUND ART

In general, a two-wheeled vehicle such as a bicycle or motorcycle are widely used as a short-distance transportation means. Generally, such a two-wheeled vehicle is not provided with a means for protecting a driver from external environmental effects due to sunlight, rain, snow, wind or the like during driving.

Conventionally, there is an example in which a protective panel made of transparent glass or synthetic resin material is mounted on a front of the two-wheeled vehicle, so as to prevent the driver from being affected in operation by the wind applied thereto during driving. For example, Korean Utility Model Registration No. 225447 discloses an example of a motorcycle which includes a wind shield mounted thereon to block the wind coming from the front during driving. However, since the rain, snow, sunlight or the like, as well as the wind also affects the driver in operation during driving of the two-wheeled vehicle, there is a need to protect the driver from such external environmental effects.

Meanwhile, a protective device for protecting the driver from the snow, rain, or strong sunlight in summer may also be mounted by fixing it to a body of the two-wheeled vehicle, however, when fixing the protective device to the body, an inconvenience in operation may occur due to driving characteristics of the two-wheeled vehicle.

Accordingly, the protective device for protecting the driver from the external environmental effects which may adversely affect the safe operation during driving of the two-wheeled vehicle needs a configuration which is capable of easily being attached to and detached from the body as necessary by the driver. However, the protective devices that have been developed up to now do not provide such a convenience for attaching and detaching the same. Therefore, there is still a need to develop the driver protective device for a two-wheeled vehicle that can be easily detachably attached and also provides convenience in storage.

DISCLOSURE

Technical Problem

In order to solve the above-described problems entailed in the conventional driver protective device for a two-wheeled vehicle, it is an object of the present invention to provide a protective device for a two-wheeled vehicle which is capable of safely protecting a driver from the external environmental effects during driving, and being easily attached to and detached from the two-wheeled vehicle as necessary with an improved convenience in storage.

Technical Solution

According to the present invention, there is provided a driver protective device for a two-wheeled vehicle, including: a main frame including a mounting frame which is mounted on a body of the two-wheeled vehicle, and a panel frame which is fixed to the mounting frame and has a front transparent panel installed therein; a storage box which is mounted on a rear portion of the two-wheeled vehicle; and an attachable protection panel including an upper panel which is attached to or detached from one end of the panel frame of the main frame, and a back panel which is attached to or detached from one side of the storage box, wherein the upper panel and the back panel are pivotly connected to each other.

Herein, the main frame may have latches formed on an upper end thereof, and the upper panel may have latch hole parts formed on an inner side thereof to be latched with the latches.

In addition, the back panel of the attachable protection panel may be provided with a fixing plate, and the storage box may have an insert hole part formed on one surface thereof, so that a portion of the fixing plate extending from the back panel is inserted into the insert hole part to fix the back panel to the storage box.

Further, the attachable protection panel may further include a pair of transparent side panels.

In addition, the panel frame of the main frame may further include magnet attaching parts of a metal material formed on both sides of one end portion thereof, and the side panels may be provide with magnets to which the magnet attaching parts are detachably attached by a magnetic force.

Furthermore, the panel frame of the main frame may further include a wiper member mounted on the front transparent panel, and an operation lever provided on a back surface thereof to pivot the wiper member.

Advantageous Effects

When using the protective device for a two-wheeled vehicle according to the present invention, it is possible to safely protect the driver from the external environmental effects during driving, and easily attach it to and detach it from the two-wheeled vehicle if necessary, as well as conveniently store the same.

BEST MODE

A driver protective device for a two-wheeled vehicle according to the present invention, may include: a main frame including a mounting frame which is mounted on a body of the two-wheeled vehicle, and a panel frame which is fixed to the mounting frame and has a front transparent panel installed therein; a storage box which is mounted on a rear portion of the two-wheeled vehicle; and an attachable protection panel including an upper panel which is attached to or detached from one end of the panel frame of the main frame, and a back panel which is attached to or detached from one side of the storage box, wherein the upper panel and the back panel are pivotly connected to each other.

Herein, the main frame may have latches formed on an upper end thereof, and the upper panel may have latch hole parts formed on an inner side thereof to be latched with the latches.

In addition, the back panel of the attachable protection panel may be provided with a fixing plate, and the storage box may have an insert hole part formed on one surface thereof, so that a portion of the fixing plate extending from the back panel is inserted into the insert hole part to fix the back panel to the storage box.

Further, the attachable protection panel may further include a pair of transparent side panels.

In addition, the panel frame of the main frame may further include magnet attaching parts of a metal material formed on both sides of one end portion thereof, and the side panels may be provide with magnets to which the magnet attaching parts are detachably attached by a magnetic force.

Furthermore, the panel frame of the main frame may further include a wiper member mounted on the front transparent panel, and an operation lever provided on a back surface thereof to pivot the wiper member.

MODE FOR INVENTION

Hereinafter, a preferred embodiment of the protective device for a two-wheeled vehicle according to the present invention will be described in detail with reference to the accompanying drawings.

The protective device for a two-wheeled vehicle according to the present invention may generally include a main frame 100, an attachable protection panel 200, and a storage box 300. Among these respective major components, first, a configuration of the main frame 100 will be described with reference to FIG. 2 as follows.

Figure 2:
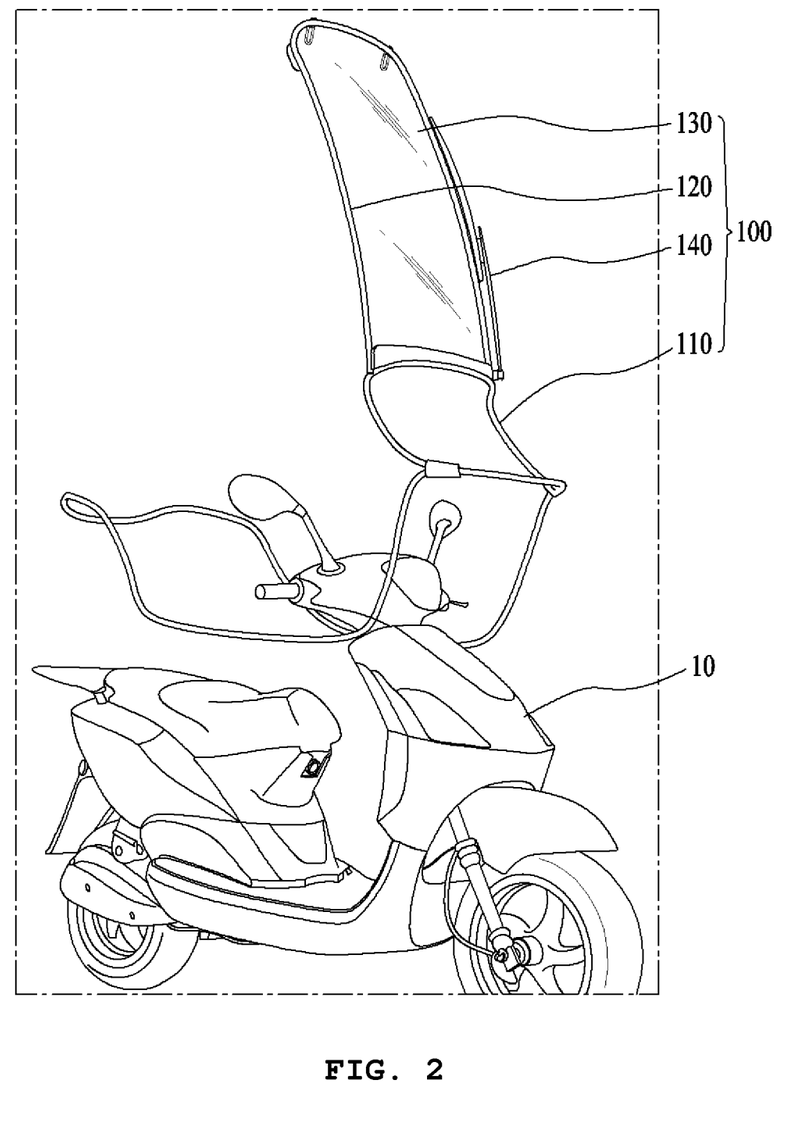
FIG. 2 is a schematic view illustrating a process in which a main frame included in the protective device for a two-wheeled vehicle according to the present invention is mounted on the motorcycle.

The main frame 100 may include, as illustrated in FIG. 2, a mounting frame 110, and a panel frame 120. Herein, the mounting frame 110 may be manufactured in a form suitable for a body shape of a two-wheeled vehicle 10 in which the mounting frame 110 is used by being mounted and fixed to the body of the two-wheeled vehicle 10. The mounting frame 110 may be made, for example, of an aluminum alloy or steel frame. The mounting frame 110 may be manufactured in a form of being easily mounted depending on the body shape of a two-wheeled vehicle 10, and may be stably fixed to the two-wheeled vehicle by a separate fixing means. In addition, the mounting frame 110 is fixed with the panel frame 120 in which a front transparent panel 130 for protecting a driver from the wind while securing a front view thereof during driving is installed. In addition, as described below, the panel frame 120 may further include a wiper member 140 mounted thereon. The wiper member 140 plays a role of cleaning a front surface of the front transparent panel 130 to secure a view therethrough against the rain or snow coming from the front during driving. Therefore, it is possible to remove rain or snow on the front surface of the front transparent panel 130 by the manual operation of the driver.

Figure 3:
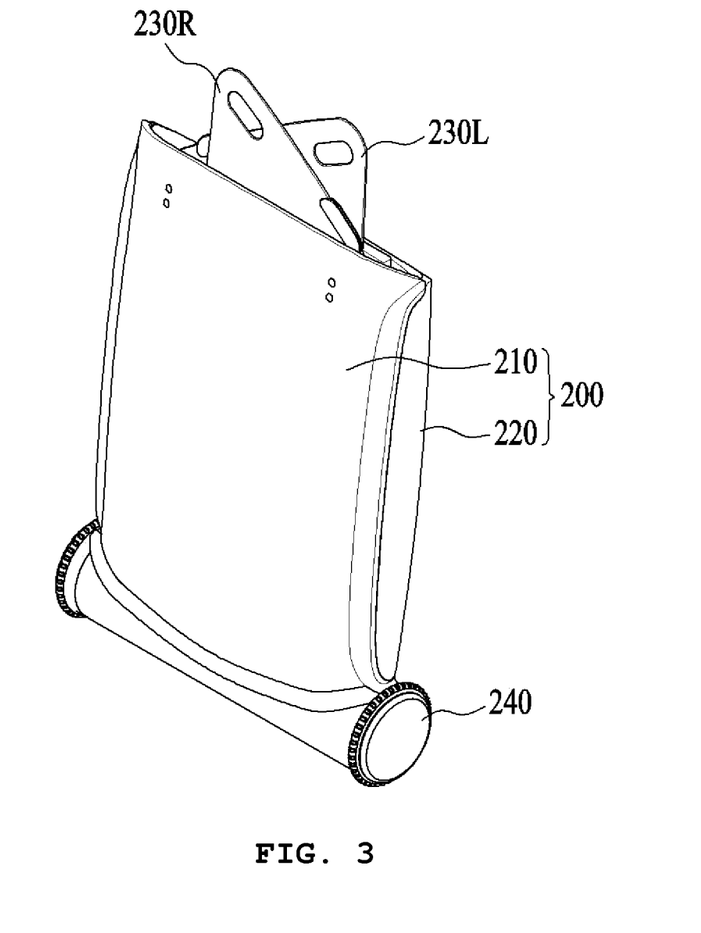
FIG. 3 is a schematic view illustrating an attachable protection panel included in the protective device for a two-wheeled vehicle according to the present invention with being folded so as to facilitate storage.
Figure 4:
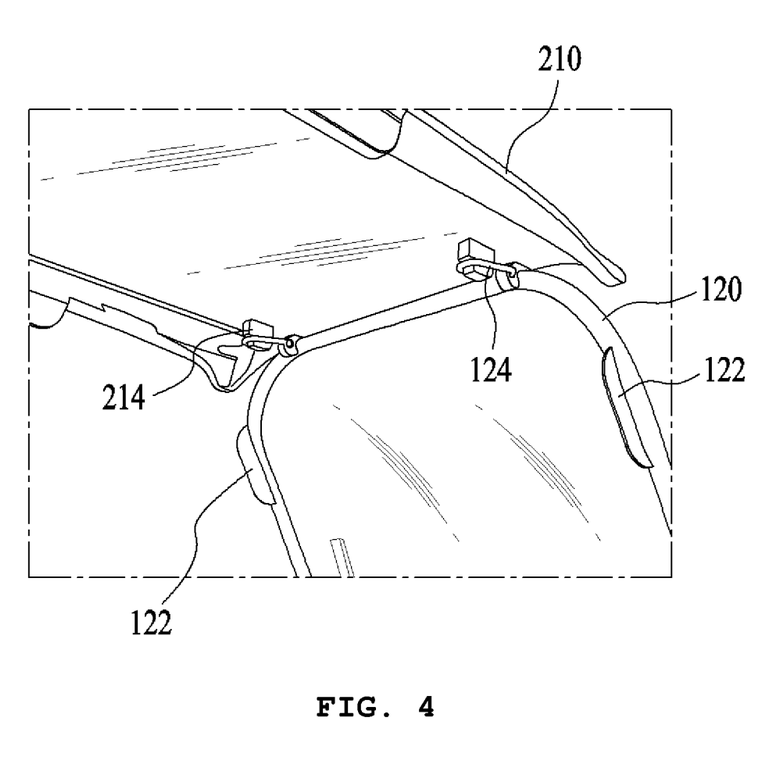
FIG. 4 is a schematic view illustrating a state in which an upper panel forming the attachable protection panel is fixed and attached to the main frame.
Figure 5:
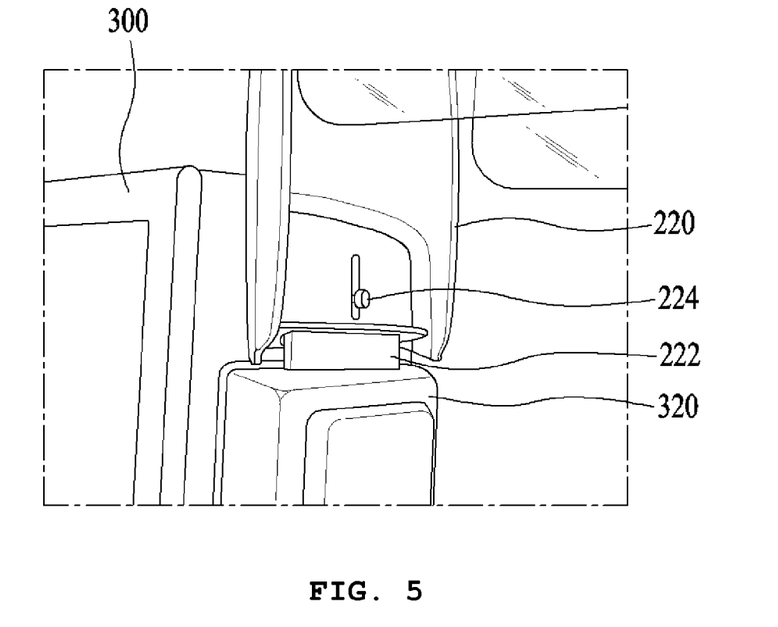
FIG. 5 is a schematic view illustrating a state in which a back panel forming the attachable protection panel is fixed and attached to a storage box.
Figure 6:
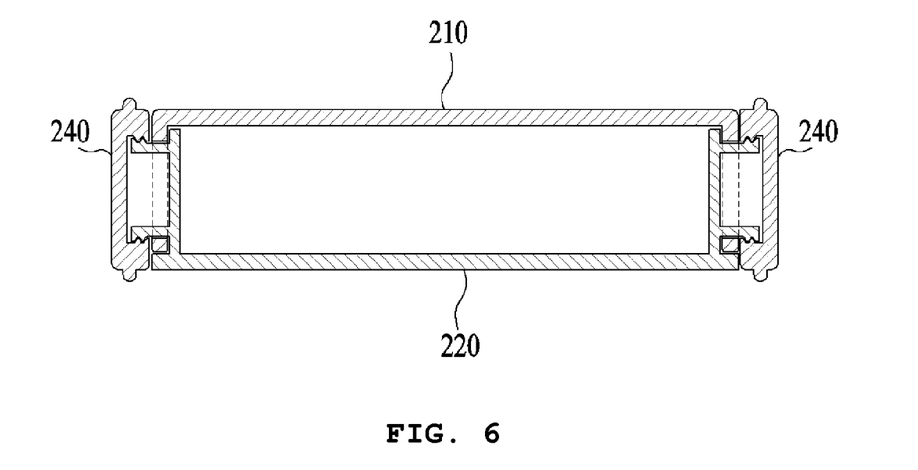
FIG. 6 is a cross-sectional view illustrating an example of a configuration in which the upper panel and the back panel forming the attachable protection panel are pivotally connected to each other.

Next, a detailed configuration of the attachable protection panel 200 will be described with reference to FIGS. 3 to 6 as follows. The attachable protection panel 200 may be configured to facilitate storage thereof, as illustrated in FIG. 3. That is, the attachable protection panel 200 may include an upper panel 210 and a back panel 220, and further include side panels 230R and 230R as necessary. Herein, it is preferable that the upper panel 210 is pivotly connected to the back panel 220, and foldably connected with the side panels 230R and 230R so as to be stored in a form as illustrated in FIG. 3. In this regard, it is preferable that the upper panel 210 and the back panel 220 are pivotly connected to each other, and for example, as illustrated in FIG. 6, are configured to be connected to each other through a pivot cap 240 so as to pivot within a predetermined angle. Further, although not illustrated in drawings, the side panels 230R and 230R may be foldably connected to the upper panel 210 by using predetermined hinge members.

Furthermore, to mount the attachable protection panel 200 on the two-wheeled vehicle 10 by unfolding, the upper panel 210 is configured to be attached to an upper end of the panel frame 120 of the main frame 100. For example, as illustrated in FIG. 4, the panel frame 120 has latches 124 formed on the upper end thereof, and the upper panel 210 has latch hole parts 214 formed on an inner side thereof to be latched with the latches 124. To mount and use the attachable protection panel, the latches 124 provided on the panel frame 120 are latched to the latch hole parts 214 provided on the upper panel 210, such that the upper panel 210 may be stably fixed to the panel frame 120. In addition, when separating, the latches 124 are removed from the latch hole parts 214 by unlatching.

Meanwhile, the back panel 220 may be configured so as to be fastened to the storage box 300 mounted on a rear portion of the two-wheeled vehicle 10. That is, as illustrated in FIG. 5, the back panel 220 is provided with a fixing plate 222, which extends to an outside by a fixing bolt 224 fixed thereto and is inserted into an insert hole part 320 formed on one side of the storage box 300, and thereby the back panel 220 may be stably fastened to the storage box 300.

Figure 1:
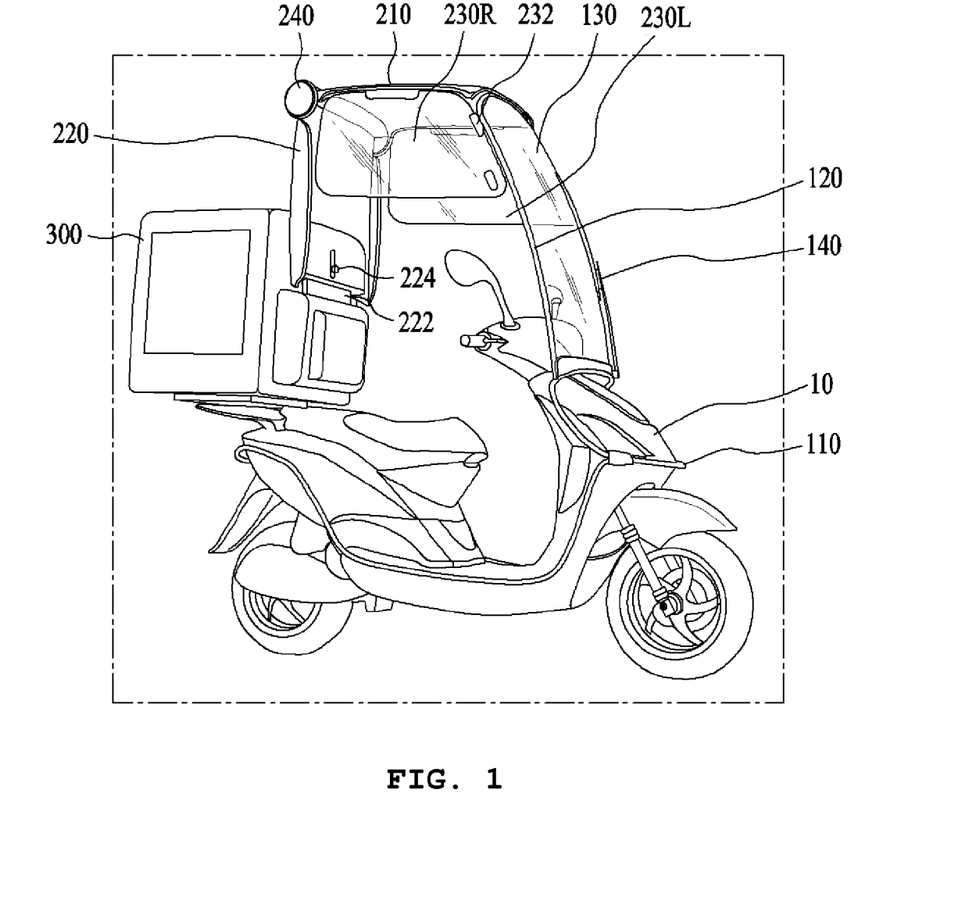
FIG. 1 is a schematic view illustrating a protective device for a two-wheeled vehicle according to the present invention with being mounted on a motorcycle.

The attachable protection panel 200 having the above-described configuration may be folded in a form as illustrated in FIG. 3, such that it is possible to reduce a space occupied by the same to facilitate the storage thereof. In addition, to mount and use the attachable protection panel, the attachable protection panel may be fastened to the main frame 100 and the storage box 300 to facilitate the mounting thereof. FIG. 1 illustrates the main frame 100, the attachable protection panel 200 and the storage box 300 with being mounted on the two-wheeled vehicle 10. As illustrated in FIG. 1, when mounting the protective device for a two-wheeled vehicle according to the present invention, a superior appearance of the two-wheeled vehicle may be provided, as well as a user may very easily mount and store the attachable protection panel.

Meanwhile, as illustrated above by example, the attachable protection panel 200 may further include the transparent side panels 230R and 230R attached thereto for preventing the rain, snow or the like from being inlet from the side of the driver while securing a side view. Herein, the side panels 230R and 230R may be configured so as to be foldably connected to the upper panel 210 by using the predetermined hinge members. Further, to attach the side panels to the attachable protection panel 200, magnets 232 may be provided on predetermined portions of the side panels 230R and 230R, and magnet attaching parts 122 (see FIG. 4) of a metal material may be provided on both sides of one end portion of the panel frame 120 at positions corresponding to the magnets. The magnets 232 provided on the side panels 230R and 230R may be attached to and detached from the magnet attaching parts 122 by a magnetic force, and thereby the side panels 230R and 230R may be stably fixed to and removed from the panel frame. In this regard, while an example in which the magnets 232 are provided on the side panels 230R and 230R, and the magnet attaching parts are provided on the panel frame 120 is described in this embodiment, it will be understood by a person who has a common knowledge in the technical field to which the present invention pertains that the magnet attaching parts may be provided on the side panels 230R and 230R, and the magnets may be provided on the panel frame 120 in reverse.

Figure 7:
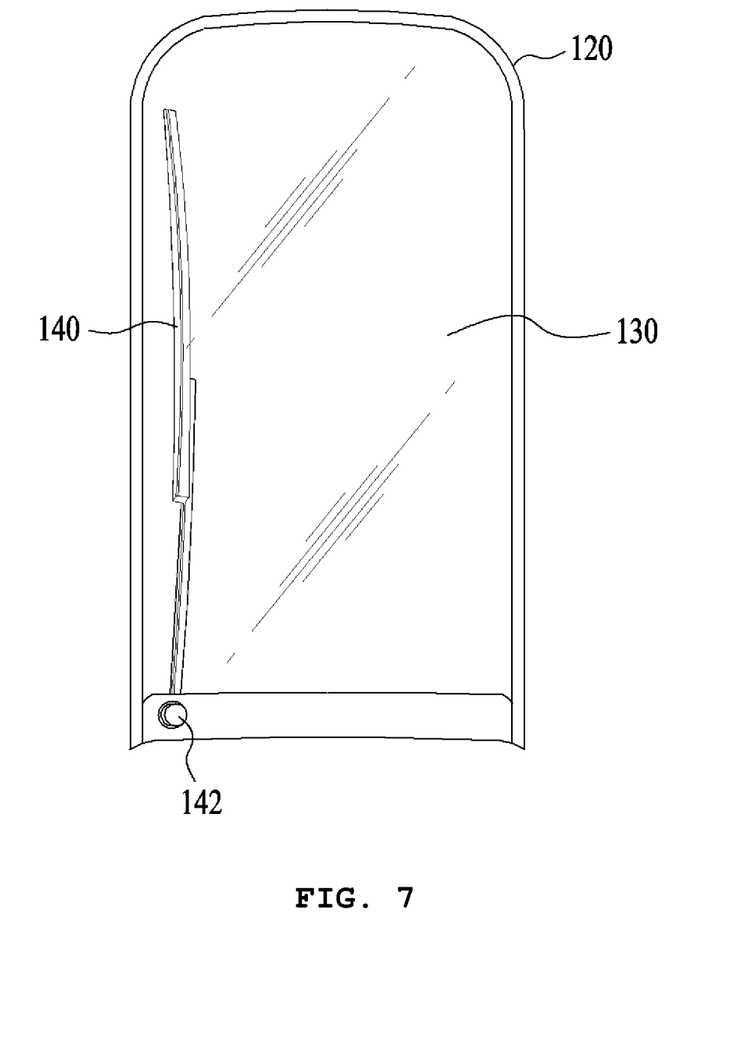
FIGS. 7 and 8 are views of an example having a wiper member mounted on a panel frame of the main frame, which illustrate a use example for pivoting the wiper member by a manual operation.
Figure 8:
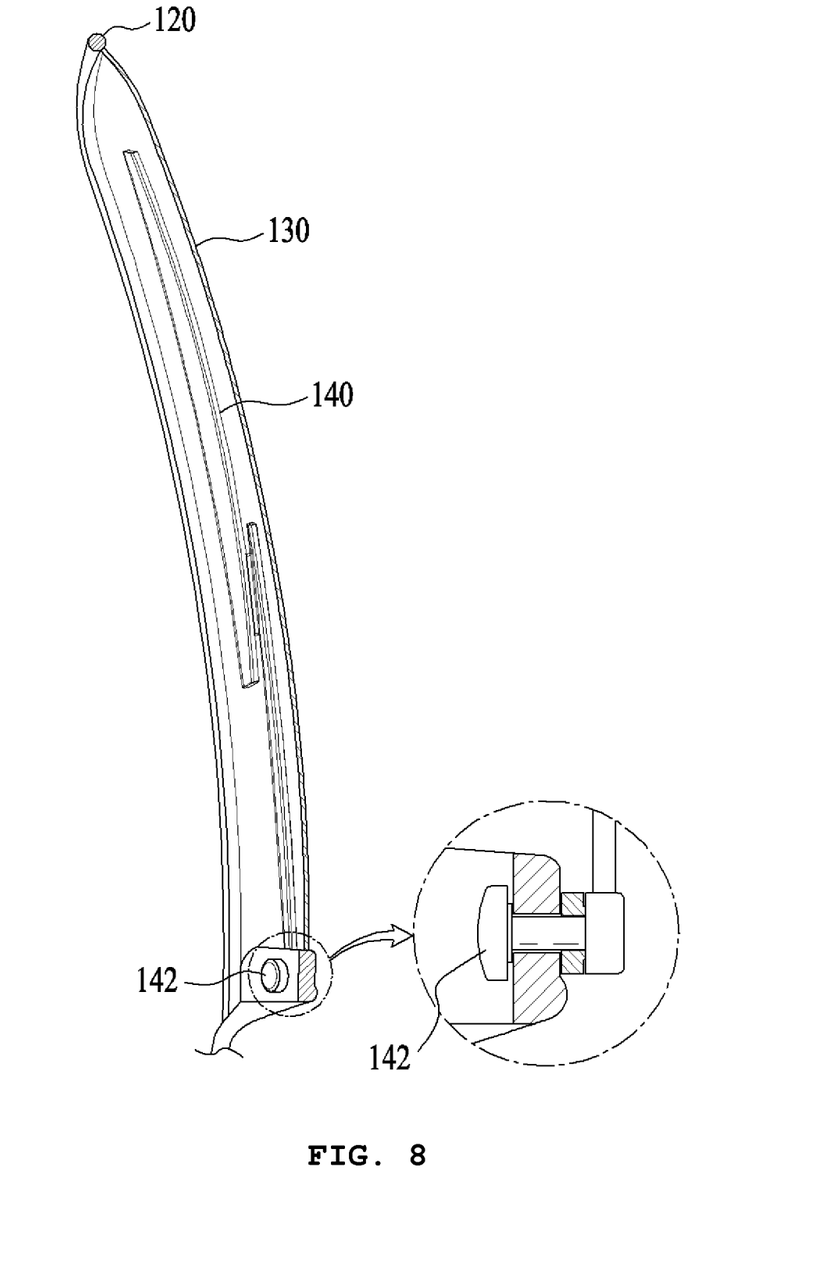

In addition, the wiper member 140 with a predetermined size may be further mounted on the front transparent panel 130 installed in the panel frame 120. Herein, the wiper member 140 may be configured so as to be driven by a predetermined motor, or otherwise, as illustrated in FIGS. 7 and 8, may be configured so as to be pivoted by the manual operation of the driver. In order to pivot the wiper member by the manual operation of the driver, it is preferable that an operation lever 142 further provided on a back surface of the panel frame 120 to pivot the wiper member 140.

While the present invention has been described with reference to the preferred embodiments, it will be understood by the person who has a common knowledge in the technical field to which the invention pertains that various modifications and variations may be made therein without departing from the scope of the present invention as defined by the appended claims. Accordingly, the embodiments described in this disclosure should not be construed to limit the technical spirit of the present invention, but should be construed to illustrate the technical spirit of the present invention. The scope of the present invention should be interpreted according to the following appended claims not the above description, and the present invention should be construed to cover all modifications or variations induced from the meaning and scope of the appended claims and their equivalents.

The invention claimed is:

1. A driver protective device for a two-wheeled vehicle, the device comprising:
   a main frame including a mounting frame which is mounted on a body of the two-wheeled vehicle, and a panel frame which is fixed to the mounting frame and has a front transparent panel installed therein;
   a storage box which is mounted on a rear portion of the two-wheeled vehicle;
   an attachable protection panel including an upper panel which is attached to or detached from one end of the panel frame of the main frame, and a back panel which is attached to or detached from one side of the storage box, wherein the upper panel and the back panel are pivotly connected to each other, wherein the back panel of the attachable protection panel is provided with a fixing plate, and wherein the storage box has an insert hole part formed on one surface thereof so that a portion of the fixing plate extending from the back panel is inserted into the insert hole part to fix the back panel to the storage box.

2. The driver protective device according to claim 1, wherein the main frame has latches formed on an upper end thereof, and the upper panel has latch hole parts formed on an inner side thereof to be latched with the latches.

3. The driver protective device according to claim 1, wherein the attachable protection panel further comprises a pair of transparent side panels.

4. The driver protective device according to claim 3, wherein the panel frame of the main frame further includes magnet attaching parts of a metal material formed on both sides of one end portion thereof, and the side panels are provide with magnets to which the magnet attaching parts are detachably attached by a magnetic force.

5. The driver protective device according to claim 1, wherein the panel frame of the main frame further includes a wiper member mounted on the front transparent panel, and an operation lever provided on a back surface thereof to pivot the wiper member.

* * * * *